R. DANIELS.

Improvement in Fruit and Vegetable Crushers.

No. 4,915. Reissued May 28, 1872.

Witnesses:
G. Mathys
A. W. Cash

Inventor:
Reuben Daniels
PER
Attorneys.

AM. PHOTO-LITHOGRAPHIC CO. N.Y. (OSBORNE'S PROCESS.)

UNITED STATES PATENT OFFICE.

REUBEN DANIELS, OF WOODSTOCK, VERMONT.

IMPROVEMENT IN FRUIT AND VEGETABLE CRUSHERS.

Specification forming part of Letters Patent No. 111,913, dated February 21, 1871; reissue No. 4,915, dated May 28, 1872.

Specification describing a new and useful Improvement in Vegetable-Crushers, invented by REUBEN DANIELS, of Woodstock, in the county of Windsor and State of Vermont.

My invention relates to mills for crushing fruits or vegetables; and consists in providing the bearing of one of the grinding-rollers with a gauge-stop, and adapting it to yield by application of a spring, for the purpose of securing a certain perfection of operation, and thus removing liability of injury to the machine, and reducing the fruit to a pomace of the desired quality or condition.

Figure 1:
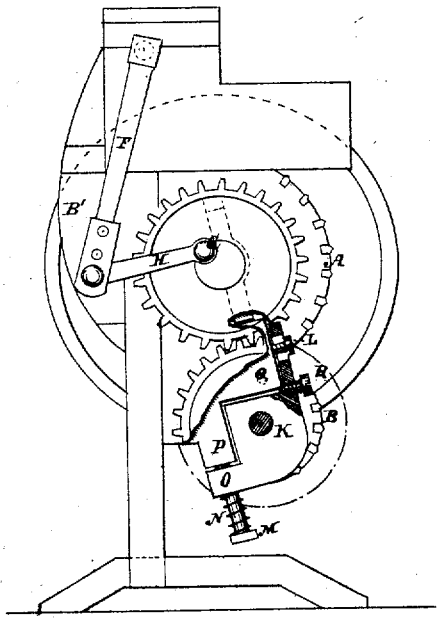
Figure 2:
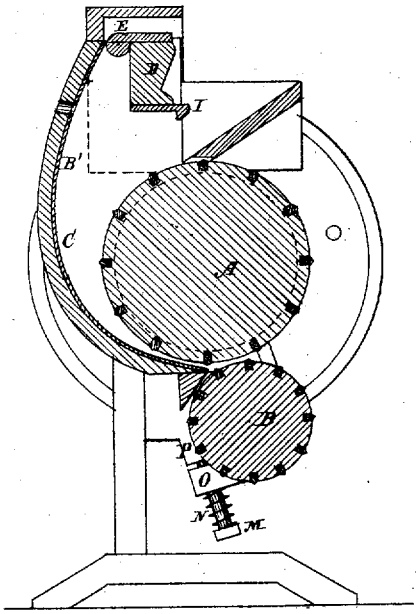

Figure 1 is an end elevation of my machine, partly in section; and Fig. 2 is a sectional elevation of the same.

A and B are the crushing-rollers, which are provided with longitudinal ribs, and are so geared together as to have different surface speed, whereby the ribs or teeth of one roller are caused to clean or scrape the smooth surface of the opposite one between its ribs. In connection with this scroll-hopper I propose to employ, at the top thereof, an oscillating feed-block, D, arranged on an axis, E, connected, by an arm, F, and rod H, with a crank, G, of one of the rollers, (preferably the larger,) whereby, as said roller is revolved, an oscillating motion will be given to said block D. I provide holes in the rod F, so that the rod H can be operated up or down thereon to vary the movements of the blocks for feeding fast or slow. The said feeding-block may have a hooked plate, I, at the bottom, for drawing the vegetables in. The bearings K for the lower roller, which are provided with projections bearing against the frame at P Q, slide to or from the other roller on screws L and rods M, and are held up so as to sustain the pressure on said lower roller by springs N, which are so arranged as to yield when any hard substance, such as nails, stones, and the like, passes between the rollers, and which would otherwise injure them. The screws R pass through the bearings K at such a point as to allow their conical ends to enter between the frame at Q and the upper surface of the bearings. Thus, by adjusting the screws in or out, the distance of the rolls apart is easily and perfectly regulated, so that while the springs N can never force the rollers together so as to cause them to crush the fruit-seeds the lower one will always yield readily to permit the passage of hard substances.

Having thus described my invention, I claim as new and desire to secure by Letters Patent—

In a fruit or vegetable crusher, the combination of springs and adjustable gauge-stops with the bearings *k* of one of the crushing or grinding rollers, substantially as specified, whereby the rollers will yield or separate to permit passage of foreign substances, while their nearness of approach to each other is fixed and perfectly controlled, as specified.

To the above specification of my invention I have signed my hand this 17th day of April, A. D. 1872.

REUBEN DANIELS.

Witnesses:
SOLON C. KEMON,
THOS. D. D. OURAND.